(12) United States Patent
Roda et al.

(10) Patent No.: US 12,428,131 B2
(45) Date of Patent: Sep. 30, 2025

(54) MODULE FOR AN AIRCRAFT TURBINE ENGINE

(71) Applicant: SAFRAN AIRCRAFT ENGINES, Paris (FR)

(72) Inventors: Jean Charles Olivier Roda, Moissy-Cramayel (FR); Didier René André Escure, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/856,838

(22) PCT Filed: Apr. 11, 2023

(86) PCT No.: PCT/FR2023/050521
§ 371 (c)(1),
(2) Date: Oct. 14, 2024

(87) PCT Pub. No.: WO2023/198987
PCT Pub. Date: Oct. 19, 2023

(65) Prior Publication Data
US 2025/0256835 A1    Aug. 14, 2025

(30) Foreign Application Priority Data
Apr. 15, 2022   (FR) .................................. 2203561

(51) Int. Cl.
*B64C 11/38*         (2006.01)
*F01D 7/00*          (2006.01)

(52) U.S. Cl.
CPC ................ *B64C 11/38* (2013.01); *F01D 7/00* (2013.01); *F05D 2220/323* (2013.01);
(Continued)

(58) Field of Classification Search
CPC . B64C 11/30; B64C 11/38; F01D 7/00; F01D 7/02; F01D 1/30; F04D 27/02;
(Continued)

(56) References Cited

U.S. PATENT DOCUMENTS

2022/0371721 A1*  11/2022  Boudebiza ............ B64C 11/308
2024/0068373 A1*   2/2024  Yadav ....................... F01D 7/00

FOREIGN PATENT DOCUMENTS

CH    514790 A    10/1971
FR    948952 A     8/1949
(Continued)

OTHER PUBLICATIONS

International Search Report mailed Jul. 10, 2023, issued in corresponding International Application No. PCT/FR2023/050521, filed Apr. 11, 2023, 6 pages.
(Continued)

*Primary Examiner* — Elton K Wong
(74) *Attorney, Agent, or Firm* — Christensen O'Connor Johnson Kindness PLLC

(57) ABSTRACT

A module having a longitudinal axis, a hydraulic actuator, and a pump for supplying the hydraulic actuator with fluid, the pump can include axial pistons intended to be movable to rotate about the longitudinal axis and configured to transfer the fluid to the hydraulic actuator, a connecting plate connected to the axial pistons and engaging with an annular main plate centered on the longitudinal axis intended to be rotated about the longitudinal axis and tilted relative to the longitudinal axis, the connecting plate being arranged between the main plate and the axial pistons, the axial pistons being movable to rotate in a direction parallel to the longitudinal axis, the tilting of the main plate resulting in the movement of the axial pistons in the direction.

13 Claims, 4 Drawing Sheets

(52) U.S. Cl.
CPC ...... *F05D 2260/74* (2013.01); *F05D 2260/79* (2013.01); *F05D 2270/64* (2013.01)

(58) Field of Classification Search
CPC ............... F04D 29/32; F05D 2230/323; F05D 2270/64; F05D 2260/74; F05D 2260/79
See application file for complete search history.

(56) References Cited

FOREIGN PATENT DOCUMENTS

FR         969611 A      12/1950
FR         2196022 A5    3/1974

OTHER PUBLICATIONS

Written Opinion mailed Jul. 10, 2023, issued in corresponding International Application No. PCT/FR2023/050521, filed Apr. 11, 2023, 9 pages.

\* cited by examiner

[Fig. 1]
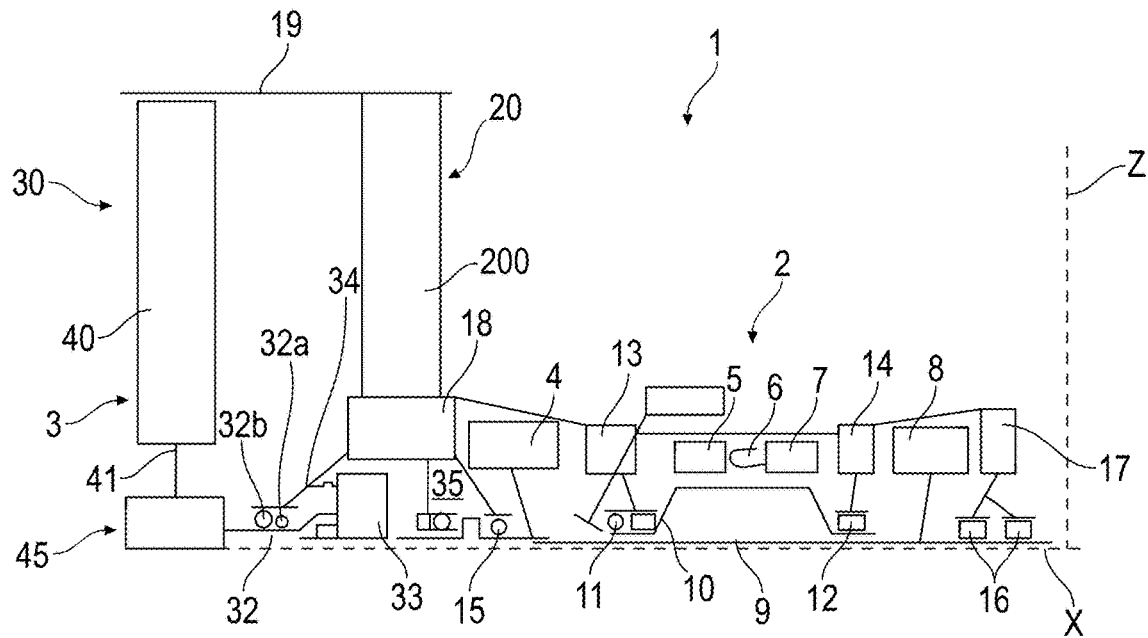
[Fig. 2]
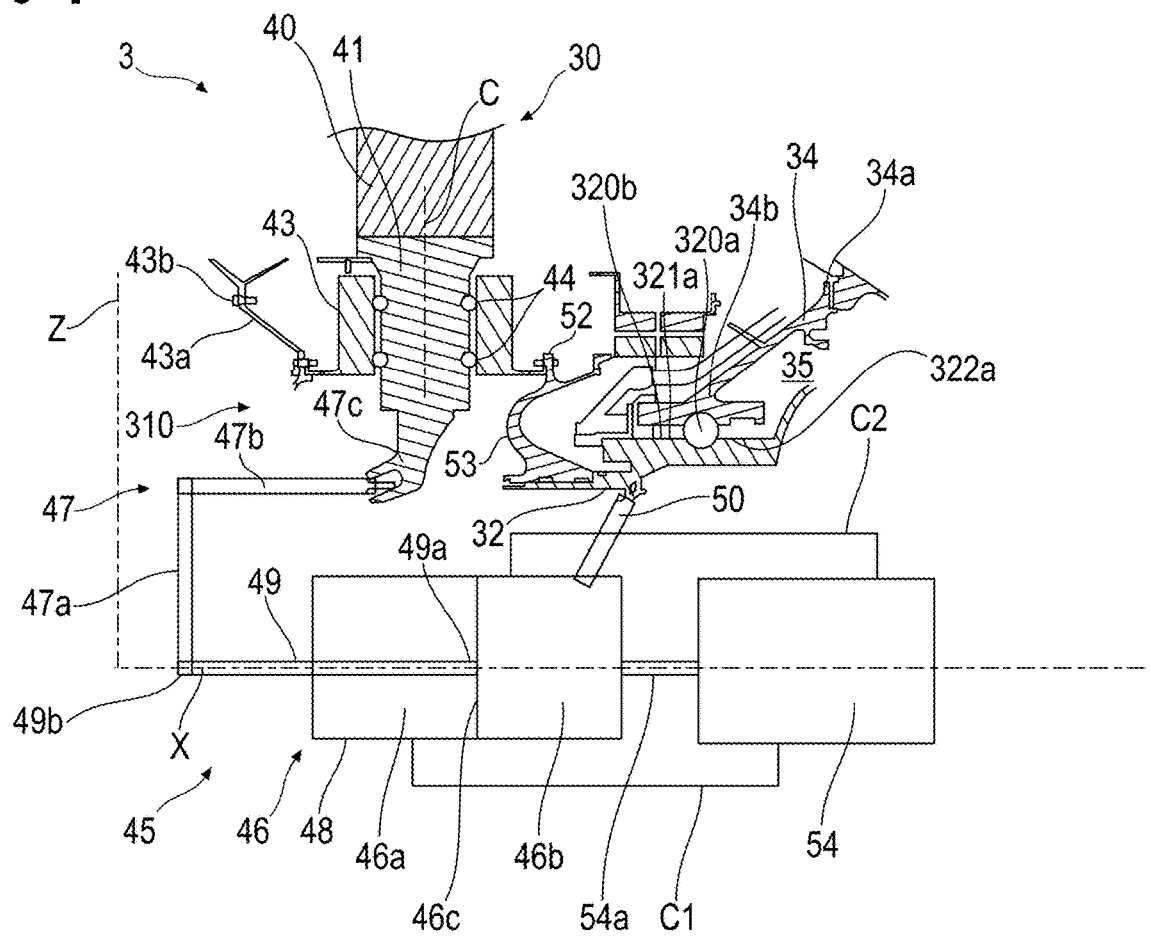

[Fig. 3a]
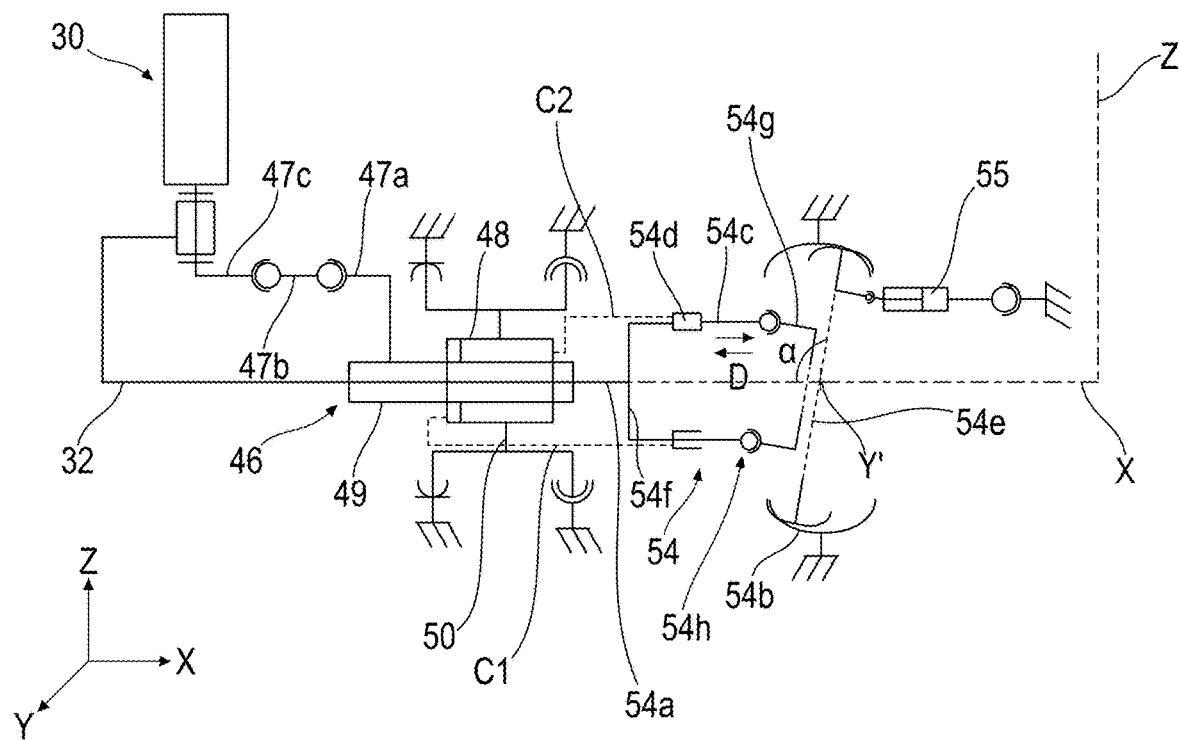
[Fig. 3b]
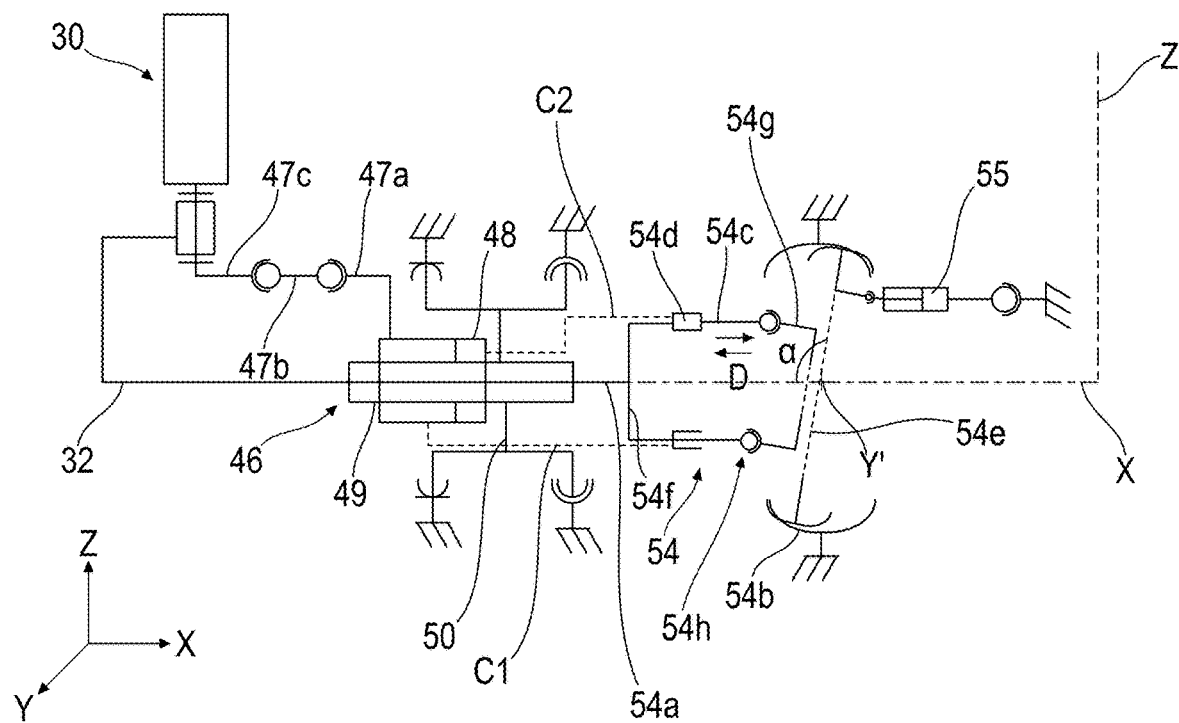

[Fig. 4a]
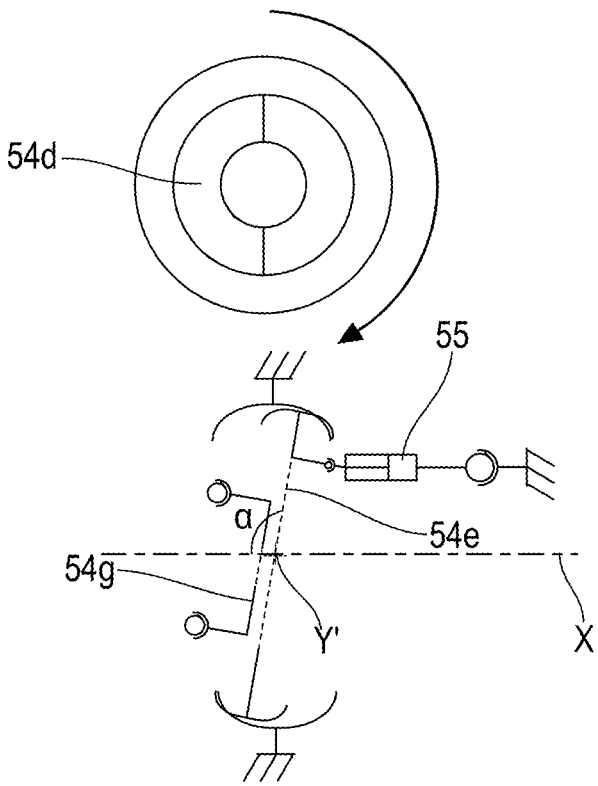
[Fig. 4b]
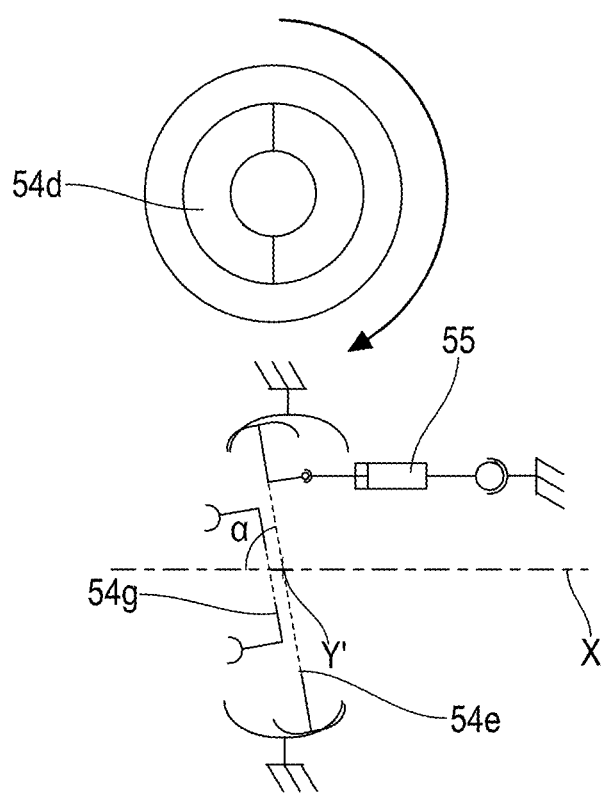

[Fig. 5]
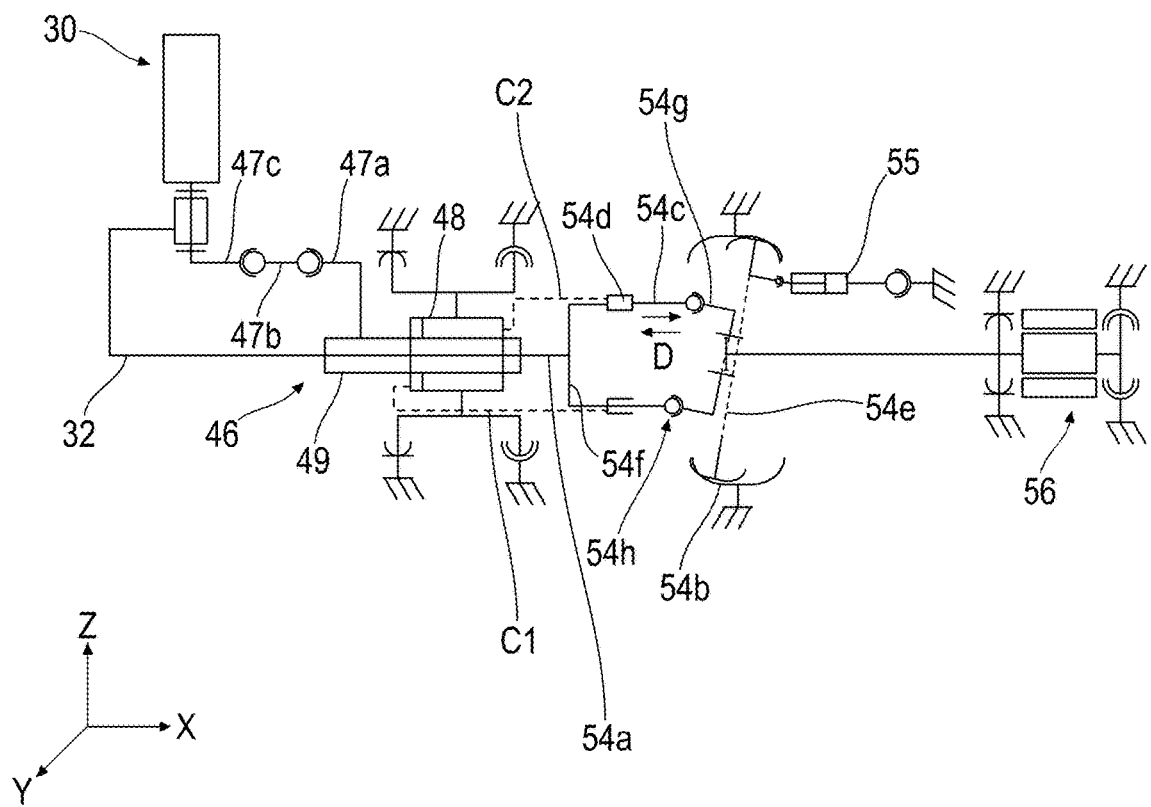
[Fig. 6]
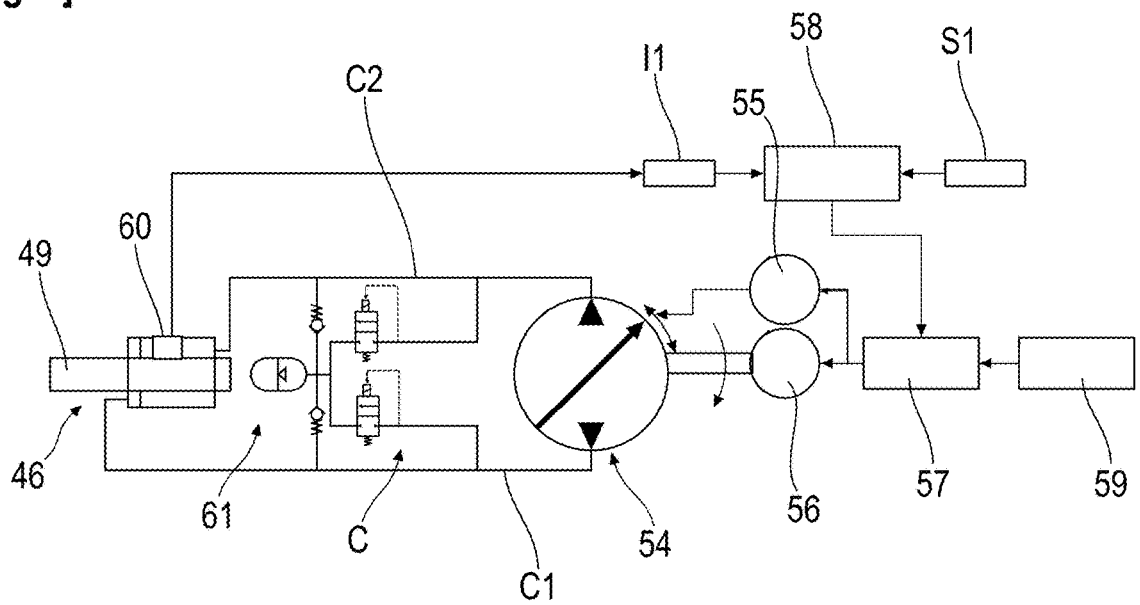

MODULE FOR AN AIRCRAFT TURBINE ENGINE

CROSS-REFERENCE TO RELATED APPLICATIONS

This application is a National Stage of International Application No. PCT/FR2023/050521, filed Apr. 11, 2023, which claims priority to French Application No. 2203561, filed Apr. 15, 2022, the entire disclosures of which are hereby incorporated by reference in their entirety for all purposes.

TECHNICAL FIELD OF THE INVENTION

The invention relates to the field of modules for aircraft turbine engines. The invention relates more particularly to the modules comprising a hub movable in rotation and variable pitch vanes carried by the hub, such as the fan or propeller modules.

TECHNICAL BACKGROUND

An aircraft turbine engine generally comprises a module extending around a longitudinal axis and having a hub movable in rotation around the longitudinal axis and on which vanes are mounted. The module is typically connected to a gas generator. The gas generator comprises, for example, from upstream to downstream, a low-pressure compressor, a high-pressure compressor, a combustion chamber, a high-pressure turbine, a low-pressure turbine and a gas exhaust nozzle. The rotor of the high-pressure compressor is connected to the rotor of the high-pressure turbine by a high-pressure shaft and the rotor of the low-pressure compressor is connected to the rotor of the low-pressure turbine by a low-pressure shaft. The low-pressure shaft is also connected to a drive shaft of the hub of the module to drive it in rotation.

The module is, for example, a fan or a propeller. In the case of a fan, the vanes are surrounded by an external casing attached to a nacelle of the aircraft. In the case of a propeller, the fan vanes are mounted outside the nacelle and are therefore not surrounded by an external casing.

In order to optimize the operation of the module and ensure its operability according to the phases of flight of the aircraft, in particular by maintaining a sufficient pumping margin, it is known to modify the orientation of the vanes during the flight of the aircraft. To this end, the vanes are movable about a pitch axis that extends perpendicular to the longitudinal axis.

The vanes are referred to as variable pitch vanes. For example, the variable pitch vanes may occupy a reverse thrust position, wherein they generate counter-thrust to help slow down the aircraft, and a feathered position, wherein, in the event of failure or breakdown, they limit their resistance.

In order to drive in rotation the vanes about their pitch axes, the module of the turbine engine typically comprises a device for changing the pitch of the vanes. The document FR-A1-3 087 232 describes a turbine engine comprising a fan module with a movable hub that may move about a longitudinal axis and on which variable pitch vanes are mounted. The module comprises a vane pitch change device comprising a hydraulic actuator connected to the vanes and a supply pump for supplying fluid to the hydraulic actuator. According to this document, the pump is secured in rotation to the hub.

To operate the pump and regulate its flow rate, the module also comprises an electric motor secured in rotation to the pump.

This configuration is not entirely satisfactory. As the electric motor is rotating and the energy source supplying the motor is in a stationary frame of reference, it is necessary to provide for a transfer of energy from a stationary frame of reference towards a rotating frame of reference. To this end, the prior art module also comprises a rotating electrical transformer for supplying electrical energy to the motor from an electrical energy source located in a stationary reference frame of the turbine engine.

However, the module of the turbine engine has an overall dimension that makes it difficult to add an electrical transformer. Adding a transformer means increasing the size of the module. The weight and the cost of the transformer are also significant.

There is therefore a need to provide a turbine engine module for an aircraft, comprising a hub carrying variable pitch vanes, which is compact, lightweight and inexpensive.

SUMMARY OF THE INVENTION

To this end, the invention proposes a module for an aircraft turbine engine, the module comprising a longitudinal axis and comprising:
 a hub centered on the longitudinal axis and configured to be movable in rotation about the longitudinal axis,
 vanes carried by the hub, each of the vanes being movable about a pitch axis extending radially with respect to the longitudinal axis,
 a device for changing the pitch of the vanes about their pitch axes, the device comprising:
 a hydraulic actuator configured to be movable in rotation about the longitudinal axis and configured to drive the vanes about their pitch axes,
 a supply pump for supplying fluid to the hydraulic actuator comprising axial pistons configured to be movable in rotation about the longitudinal axis and configured to transfer the fluid to the hydraulic actuator, a connecting plate connected to the axial pistons and cooperating with an annular main plate centered on the longitudinal axis, the main plate being configured to be stationary in rotation about the longitudinal axis and is tiltable relative to the longitudinal axis, the connecting plate being arranged between the main plate and the axial pistons, the axial pistons being able to move in translation in a direction parallel to the longitudinal axis, the tilting of the main plate causing the axial pistons to move in this direction, and
 an auxiliary actuator connected to the connecting plate and configured to drive in rotation the connecting plate about the longitudinal axis.

According to the invention, the module comprises a pump with axial pistons connected to a connecting plate and driven in translation by a main plate.

The stroke of the pistons varies according to the tilting of the main plate, allowing the pump flow rate to be varied. Depending on the pump flow rate, the hydraulic actuator may vary the pitch of the vanes to the desired angle.

As the pump has a variable flow rate, there is no longer any need for a rotating electric motor to regulate the flow rate of the pump. This allows to eliminate the need for a rotating electrical transformer to supply the motor with electrical energy.

The module according to the invention is therefore more compact, lighter and consumes less energy.

Also, according to the invention, the main plate is stationary in rotation. This allows to simplify the configuration of the pump and of the module.

In addition, according to the invention, the axial pistons rotate. This allows to eliminate the need for a rotating hydraulic transfer to transfer fluid between the pump and the hydraulic actuator, thereby limiting the fluid leaks.

The invention may comprise one or more of the following characteristics, taken alone or in combination with each other:
- the pump comprises a shroud mounted around the main plate and the connecting plate and configured to be stationary in rotation about the longitudinal axis,
- the main plate is tiltable through an angle of tilting a of between −45° and 45°, an angle α of 0° corresponding to a position of the main plate wherein it is perpendicular to the longitudinal axis,
- the device further comprises an actuator connected to the main plate and configured to tilt the main plate relative to the longitudinal axis,
- the connecting plate is configured to be able to move in rotation about the longitudinal axis and is in flat abutment on the main plate,
- the axial pistons are connected to the connecting plate by a ball-and-socket joint,
- the pump comprises a transmission axle centered on the longitudinal axis, secured in rotation to the connecting plate, and around which the main plate is mounted,
- a drive shaft secured in rotation to the hub and configured to drive the transmission axle in rotation about the longitudinal axis,
- an electronic control circuit configured to transmit a command to the auxiliary actuator to drive in rotation the connecting plate about the longitudinal axis,
- the auxiliary actuator is connected to the connecting plate by a splined connection or a universal joint connection or an Oldham joint connection or an embedded connection,
- the hydraulic actuator is a cylinder secured in rotation to the drive shaft, the hydraulic actuator comprising a case and a rod arranged within the case, and a first and a second chambers connected to the pump defined in the case, the rod or the case being movable in translation and connected to the vanes,
- the case or the rod is secured in rotation to the drive shaft.

The invention also relates to a turbine engine for an aircraft comprising a module according to any of the preceding characteristics.

BRIEF DESCRIPTION OF THE FIGURES

Further characteristics and advantages will be apparent from the following description of a non-limiting embodiment of the invention with reference to the appended drawings wherein:

FIG. 1 is a schematic representation of an aircraft turbine engine in axial cross-section;

FIG. 2 is a schematic representation in axial cross-section of a module according to the invention;

FIG. 3a is a schematic functional representation of a module according to an example of embodiment of the invention;

FIG. 3b is a schematic functional representation of a module according to another embodiment of the invention;

FIG. 4a is a schematic representation of the plate of the pump equipping the module, the plate being in a first position;

FIG. 4b is a schematic representation of the plate of the pump equipping the module, with the plate in a second position;

FIG. 5 is a schematic representation of a module according to a particular embodiment of the invention;

FIG. 6 is a schematic representation of a module according to a particular embodiment of the invention.

DETAILED DESCRIPTION OF THE INVENTION

An aircraft comprises a fuselage and at least two wings extending on either side of the fuselage along the fuselage axis. At least one turbine engine 1 is mounted under each wing. The turbine engine 1 may be a turbojet engine, for example a turbine engine equipped with a ducted fan equipped with variable pitch vanes, referred by the acronym VPF for "Variable Pitch Fan". Alternatively, the turbine engine 1 may be a turboprop engine, for example a turbine engine equipped with a non-ducted propeller ("USF" for "Unducted Single Fan" or "UDF" for "Unducted Dual Fan"). Of course, the invention is applicable to other types of turbine engine.

In the present invention, the terms "axial" and "axially" are defined in relation to a longitudinal axis X of the turbine engine 1 or of a module 3 of the turbine engine 1. The terms "upstream" and "downstream" are defined in relation to the circulation of the gases in the turbine engine 1 and here along the longitudinal axis X (and even from left to right in FIG. 1). Similarly, the terms "radial" and "radially" are defined in relation to a radial axis Z perpendicular to the longitudinal axis X. The terms "internal", "inner", "external" and "outer" are defined in relation to the distance from the longitudinal axis X along the radial axis Z.

FIG. 1 shows an example of the turbine engine 1. The turbine engine 1 comprises a gas generator 2 and a module 3 in accordance with the invention.

The gas generator 2 comprises, from upstream to downstream, a low-pressure compressor 4, a high-pressure compressor 5, a combustion chamber 6, a high-pressure turbine 7 and a low-pressure turbine 8. The rotors of the low-pressure compressor 4 and of the low-pressure turbine 8 are mechanically connected by a low-pressure shaft 9 so as to form a low-pressure body. The rotors of the high-pressure compressor 5 and of the high-pressure turbine 7 are mechanically connected by a high-pressure shaft 10 so as to form a high-pressure body. The high-pressure shaft 10 extends radially at least partly outside the low-pressure shaft 9. The low-pressure shaft 9 and the high-pressure shaft 10 are coaxial. The high-pressure body is guided in rotation about the longitudinal axis X by a first rolling bearing 11 upstream and a second rolling bearing 12 downstream. The first bearing 11 is mounted radially between an inter-compressor casing 13 and an upstream end of the high-pressure shaft 10. The inter-compressor casing 13 is arranged axially between the low and high pressure compressors 4, 5. The second bearing 12 is mounted between an inter-turbine casing 14 and a downstream end of the high-pressure shaft 10. The inter-turbine casing 14 is arranged axially between the low and high pressure turbines 8, 7. The low-pressure body is guided in rotation about the longitudinal axis X via a third rolling bearing 15 and a fourth rolling bearing 16. The fourth bearing 16 is a double bearing, for example. The fourth bearing 16 is mounted between an exhaust casing 17 and a downstream end of the low-pressure shaft 9. The exhaust casing 17 is located downstream of the low-pressure turbine 8. The third bearing 15 is mounted between an inlet casing 18 and an upstream end of the low-pressure shaft 9. The inlet casing 18 is located upstream of the low-pressure compressor 4. More specifically, the inlet casing 18 is arranged axially between the module 3 and the low-pressure compressor 4.

In the example shown in FIG. 1, the module 3 is mounted upstream of the gas generator 2. Advantageously, according to this example, a stator vane 20 is arranged downstream of the module 3. The stator vane 20 comprises, for example, vanes 200 mounted on the inlet casing 18. These vanes 200 are referred to as OGV (Outlet Guide Vanes). The stator vane 20 allows to rectify the flow downstream of the module 3 to optimize the operation of the turbine engine 1.

In another embodiment, not shown, the module 3 is mounted downstream of the gas generator 2.

In addition, the module 3 according to the invention comprises vanes 30.

In the example shown in FIG. 1, the vanes 30 are surrounded by an external casing 19.

A nacelle (not shown) is attached to the external casing 19. In this example, the module 3 is a fan module.

In another example not shown, the module 3 is a propeller module. The vanes 30 are not surrounded by an external casing and the vanes 30 are, in this example, arranged around the nacelle.

With reference to FIG. 2, the module 3 according to the invention also comprises a hub 43. The hub 43 is annular and centered on the longitudinal axis X. It comprises an internal space 310. The hub 43 is secured to a cone centered on the longitudinal axis X. The cone is arranged upstream of the hub 43. The cone forms an air inlet nozzle for the turbine engine 1. The hub 43 is for example connected to the cone by an attachment arm 43a extending radially with respect to the longitudinal axis X. The attachment arm 43a is connected to the cone and to the hub 43 by an assembly of screws and nuts 43b, for example. The hub 43 comprises inner housings evenly distributed around the longitudinal axis X.

The vanes 30 are carried by the hub 43 and are evenly distributed on the hub 43. They extend radially from the hub 43. The vanes 30 are driven in rotation about the longitudinal axis X. Each vane 30 comprises a root 41 and a blade 40 extending radially outwards from the root 41.

The root 41 comprises, for example, a tenon mounted in a sleeve. The root 41 is pivotally mounted along a pitch axis C in the inner housing of the hub 43. Advantageously, a root 41 is mounted per inner housing. The sleeve is centered on the pitch axis C and is housed in the inner housing of the hub 43.

The pitch axis C is parallel to the radial axis Z and therefore extends radially with respect to the longitudinal axis X. The root 41, via the sleeve in particular, is pivotally mounted in the hub 43 by means of two guide bearings 44 mounted in each inner housing and superimposed along the radial axis Z. These bearings 44 are preferably, but not exclusively, ball bearings.

The hub 43 is movable in rotation about the longitudinal axis X. To drive the hub 43 in rotation about the longitudinal axis X and hence the vanes 30, the module 3 comprises a drive shaft 32. The drive shaft 32 is arranged at least partly in the internal space 310. It is centered on the longitudinal axis X. The drive shaft 32 is guided in rotation in the internal space 310 by a first guide bearing 32a and a second guide bearing 32b. The first guide bearing 32a is a rolling bearing, for example. The second guide bearing 32b is a rolling bearing, for example. The first guide bearing 32a is arranged downstream of the second guide bearing 32b. The first guide bearing 32a comprises balls 320a arranged between an external ring 321a and an internal ring 322a. The second guide bearing 32b comprises rollers 320b arranged, for example, between the external ring 321a and the internal ring 322a. The internal ring 322a is secured to the drive shaft 32 and the external ring 321a is carried by a bearing support 34. The first and second guide bearings 32a, 32b may share the same external and internal rings or be formed by separate rings. The bearing support 34 is stationary. It extends radially between an end flange 34a connected to the inlet casing 18 and a base 34b which cooperates with the external ring 321a.

The drive shaft 32 comprises an upstream end to which a trunnion 53 is attached. The trunnion 53 extends radially outwards. The trunnion 53 is connected, for example, by a first flange 52 to the hub 43 to drive it in rotation about the longitudinal axis X.

The drive shaft 32 is driven in rotation by the low-pressure shaft 9, for example. In order to reduce the speed of rotation of the drive shaft 32 relative to the low-pressure shaft 9, the module 3 advantageously comprises a mechanical speed reducer 33 connecting the low-pressure shaft 9 to the drive shaft 32.

Referring to FIG. 1, the speed reducer 33 is arranged in a lubrication enclosure 35. The lubrication enclosure 35 is for example arranged axially between the third bearing 15 and the second guide bearing 32b, inside the inlet casing 18.

The speed reducer 33 is, for example, a speed reducer 33 with a planetary or epicyclic gear train. The speed reducer 33 comprises an inner planetary gear, also referred by sun gear configured to cooperate with the low-pressure shaft 9, an outer ring gear secured in rotation to the drive shaft 32 or connected to a stationary structure of the turbine engine 1 such as the inlet casing 18 and a planet carrier stationary in rotation, for example secured to the inlet casing 18 or secured in rotation to the drive shaft 32. The speed reducer 33 also comprises planet gears that mesh with the sun gear and the outer ring gear.

Each vane 30 is movable in rotation about the pitch axis C. To this end, according to the invention, the module 3 comprises a device 45 for changing the pitch of the vanes 30 about their pitch axes C. Advantageously, the device 45 is at least partly arranged in the internal space 310 of the hub 43. This allows to facilitate the maintenance of the device 45 as it is easily accessible. The device 45 is arranged upstream of the speed reducer 33. The device 45 comprises a hydraulic actuator 46 movable in rotation about the longitudinal axis X and configured to drive the vanes 30 about their pitch axes C. The hydraulic actuator 46 is, for example, a hydraulic cylinder. For example, it is arranged in the internal space 310. The hydraulic actuator 46 is secured in rotation to the drive shaft 32. The drive shaft 32 has, for example, a shell 50 which extends radially inwards from the drive shaft 32 and is connected to the hydraulic actuator 46.

The hydraulic actuator 46 comprises a case 48 and a rod 49. The case 48 is cylindrical, centered on the longitudinal axis X. This configuration allows to limit the overall dimension required by the hydraulic actuator 46 in the hub 43, both axially and radially. The case 48 extends radially around the rod 49.

The rod 49 extends axially between a first end 49a and a second end 49b.

The hydraulic actuator 46 also comprises a first chamber 46a and a second chamber 46b. The first and second chambers 46a, 46b are defined inside the case 48 and are axially delimited by an annular wall 46c arranged in the case 48. The annular wall 46c, for example, is secured to the second end 49b of the rod 49.

In a first example shown in FIG. 3a, the rod 49 may be moved in translation in the case 48. The rod 49 moves in translation along the longitudinal axis X in the case 48. In this example, the case 48 is secured to the drive shaft 32. The shell 50 is connected to the case 48.

According to another example shown in FIG. 3b, the case 48 may be moved in translation along the longitudinal axis X. In this example, the rod 49 is secured in rotation to the drive shaft 32. The shell 50 is connected to the rod 49.

The rod 49 or the case 48 moves in translation under the effect of the pressure of a fluid circulating in each chamber 46a, 46b.

The device 45 advantageously comprises a connection mechanism 47 connecting the vanes 30 to the hydraulic actuator 46 and in particular to the rod 49 or to the case 48 of the hydraulic actuator 46. The connection mechanism 47 allows to transform the translational movement of the hydraulic actuator 46 into a rotational movement of the vanes 30. The connection mechanism 47 comprises an annular part 47a, a connecting rod 47b and an eccentric 47c. The annular part 47a is removably attached to the rod 49 as shown in FIG. 3a and, for example, to the second end 49b or to the case 48 as shown in FIG. 3b. The annular part 47a is also detachably connected to the connecting rod 47b. The connecting rod 47b cooperates with the eccentric 47c which is secured to the vane 30 and in particular connected to the root 41. The annular part 47a thus allows the hydraulic actuator 46 to be dismantled for maintenance operations, for example, without affecting the vanes 30, which remain attached to the connecting rods 47b by means of the eccentric 47c.

In order to drive the rod 49 or the case 48 in translation so as to drive the vanes 30 about their pitch axes C via the connection mechanism 47, the device 45 according to the invention also comprises a pump 54 for supplying fluid to the hydraulic actuator 46. The pump 54 is located upstream of the reducer 33, for example. The pump 54 is arranged inside the drive shaft 32.

The pump 54 is a reversible hydraulic pump with variable displacement and axial pistons.

The pump 54 is connected to the first and second chambers 46a, 46b of the hydraulic actuator 46.

Referring to FIGS. 3a and 3b, the pump 54 comprises a transmission axle 54a around which a main plate 54e is mounted. The transmission axle 54a is centered on the longitudinal axis X and is driven in rotation by the drive shaft 32 by means of an accessory gearbox (AGB), for example.

Advantageously, the pump 54 also comprises a shroud 54b mounted around the main plate 54e. The shroud 54b is for example annular and centered on the longitudinal axis X. The shroud 54b is stationary in rotation with respect to the longitudinal axis X. It is connected to a stationary portion of the module 3 or of the turbine engine 1, such as the inlet casing 18. According to the invention, the pump 54 comprises axial pistons 54c configured to transfer the fluid to the hydraulic actuator 46. The axial pistons 54c are cylindrical or substantially cylindrical and have an axis of revolution parallel to the longitudinal axis X. The pump 54 comprises at least two axial pistons 54c which are advantageously evenly distributed around the longitudinal axis X. The axial pistons 54c are secured in rotation to the transmission axle 54a.

According to the invention, the axial pistons 54c may move in translation in a direction D parallel to the longitudinal axis X. Advantageously, the axial pistons 54c may move in translation in two opposite directions along the direction D, for example from upstream to downstream and from downstream to upstream. More particularly, each axial piston 54c may move in translation in a reception chamber 54d for receiving fluid, formed, for example, in a barrel 54f opposite the main plate 54e. There are as many reception chambers 54d as there are axial pistons 54c. According to another example not shown, each reception chamber 54d is arranged in a separate barrel, i.e. there are as many barrels as there are reception chambers 54d. Each reception chamber 54d is secured in rotation to the transmission axle 54a. For example, they are secured in rotation to the hydraulic actuator 46, in particular to the case 48.

The main plate 54e is annular and centered on the longitudinal axis X. In particular, it extends in a radial plane with respect to the longitudinal axis X and therefore with respect to the transmission axle 54a. The main plate 54e is stationary in rotation about the longitudinal axis X. It is therefore not driven in rotation by the transmission axle 54a.

According to the invention, the main plate 54e may be tilted with respect to the longitudinal axis X. The main plate 54e is therefore mounted so that it may rotate about an axis of rotation Y which is perpendicular to the longitudinal axis X and the radial axis Z. The main plate 54e is for example connected to the transmission axle 54a by a pivot connection Y' having an axis parallel to the axis of rotation Y.

Advantageously, the main plate 54e may be tilted at an angle of tilting a of between −45° and 45°, it being understood that the angle α of 0° corresponds to a position of the main plate 54e wherein it is perpendicular to the longitudinal axis X.

Advantageously, the device 45 also comprises an actuator 55 connected to the main plate 54e. The actuator 55 is configured to tilt the main plate 54e relative to the longitudinal axis X. The actuator 55 is, for example, electric, such as an electric cylinder, or hydraulic, such as a hydraulic cylinder. The actuator 55 is secured to the main plate 54e and is therefore stationary in rotation about the longitudinal axis X. For example, it is connected to the main plate 54e by a ball-and-socket joint. This configuration makes it easier for the actuator 55 to tilt the main plate 54e without complicating the configuration of the module 3. The actuator 55 may also be connected to a casing of the module 3 or of the turbine engine 1 by a ball-and-socket joint.

According to the invention, the pump 54 comprises a connecting plate 54g connected to the axial pistons 54c and arranged between the main plate 54e and the axial pistons 54c. The connecting plate 54g is mounted around the transmission axle 54a. The connecting plate 54g and the main plate 54e are coaxial. Advantageously, the main plate 54e has an external diameter greater than the external diameter of the connecting plate 54g. The main plate 54e cooperates with the connecting plate 54g. Advantageously, the connecting plate 54g is secured in rotation to the main plate 54e about the axis of rotation Y. The connecting plate 54g may thus be tilted in correlation with the main plate 54e. The connecting plate 54g is preferably tiltable at an angle identical to the angle of tilting a of the main plate 54e. The connecting plate 54g, for example, is in flat abutment on the main plate 54e. Preferably, the connecting plate 54g is movable in rotation about the longitudinal axis X. It is secured in rotation to the transmission axle 54a.

The axial pistons 54c are connected to the connecting plate 54g by a ball-and-socket joint 54h.

As the axial pistons 54c are connected to the connecting plate 54g, the tilting of the main plate 54e causes the tilting of the connecting plate 54g and a displacement of the axial pistons 54c in the direction D. The travel of the axial pistons 54c in the reception chambers 54d is then variable according to the tilting of the main plate 54e. This allows to regulate the flow rate of the pump 54. Advantageously, as shown in FIG. 4a, when the angle of tilting a of the main plate 54e is between 0° and 45°, the pump 54 is in discharge mode, whereas when the angle of tilting a of the main plate 54e is between −45° and 0°, as shown in FIG. 4b, the pump 54 is in intake mode.

According to a preferred embodiment of the invention illustrated in FIG. 5, the device 45 also comprises an auxiliary actuator 56 connected to the connecting plate 54g advantageously by means of a spline connection such as short splines with rounded teeth or a universal joint connection or an Oldham joint connection or an embedded connection. The auxiliary actuator 56 is configured to drive in rotation the connecting plate 54g. The auxiliary actuator 56 is, for example, an electric motor comprising a rotor connected to the connecting plate 54g and a stator arranged coaxially around the rotor. For example, the rotor is centered on the longitudinal axis X and the stator is connected to a stationary structure of the turbine engine 1 or of the module 3.

An auxiliary actuator 56 of this type allows the connecting plate 54g to be driven in rotation about the longitudinal axis X when the drive shaft 32 is not active. Typically, during the maintenance phases of the turbine engine 1, the drive shaft 32 is stationary in rotation and therefore does not drive the connecting plate 54g in rotation about the longitudinal axis X via the drive shaft 54a of the pump 54. During these phases, the connecting plate 54g is driven in rotation by the auxiliary actuator 56. The auxiliary actuator 56 is, for example, coupled to the pump 54 by means of gears coupled by dog clutches, allowing the auxiliary actuator 56 to drive the connecting plate 54g only when the drive shaft 32 is not being driven in rotation.

The splined, universal joint, Oldham joint or embedded connection are the preferred connections as they are compatible with the angle of tilting of the connecting plate 54g.

With reference to FIG. 6, advantageously, in order to control and regulate the speed of the actuator 55 and possibly the auxiliary actuator 56, the module 3 also comprises a control case 57 and an electronic control circuit 58. The control case 57 is supplied with electrical energy by an electrical energy source 59 located in the turbine engine 1, for example. The electronic control circuit 58 is located in the turbine engine 1, for example. The electronic control circuit 58 is, for example, a digital computer such as a FADEC (Full Authority Digital Electronic Computer).

Advantageously, the module 3 comprises a sensor 60. The sensor 60 allows to measure an information I1 which is transmitted to the electronic control circuit 58. The information I1 is, for example, the position of the case 48 or of the rod 49 of the hydraulic actuator 46. The sensor 60 is, for example, an LVDT (Linear Variable Differential Transformer) type linear sensor. The sensor 60 is configured to measure the position of the rod 49 or of the case 48 of the hydraulic actuator 46. For example, it is located in the hydraulic actuator 46. In another example not shown, the sensor 60 is a position sensor. It is used to measure the position of the vanes 30.

The sensor 60 supplies the information I1 to the electronic control circuit 58. The electronic control circuit 58 will then supply a command to the control case 57 which will determine the position of the actuator 55 and if necessary, control the rotation of the auxiliary actuator 56 in order to regulate the flow rate of the pump 54 via the tilting of the auxiliary plate 54g and modify the position of the rod 49 or of the case 48 of the hydraulic actuator 46 according to the desired pitch setting of the vanes 30.

The electronic control circuit 58 also or alternatively receives a signal S1 on the flight conditions of the aircraft and/or the state of the turbine engine 1. The signal S1 is also or alternatively taken into account to supply the command O1 to control case 57.

The pump 54 is fluidically connected to a hydraulic circuit C. The hydraulic supply circuit C comprises, for example, a first circuit C1 connecting at least one of the reception chambers 54d of the pump 54 to the first chamber 46a of the hydraulic actuator 46 and a second circuit C2 connecting the second chamber 46b of the hydraulic actuator 46 to at least one of the reception chambers 54d of the pump 54.

The hydraulic supply circuit C is a closed circuit. It is independent of a hydraulic lubrication circuit for the turbine engine 1 configured, for example, to lubricate the reducer 33. The fluid in the hydraulic supply circuit C supplying the hydraulic actuator 46 is, for example, a hydraulic fluid. The liquid is, for example, pressurized oil or a phosphate ester such as Skydrol. The fluid is thus a fluid circulating in a closed circuit in the hydraulic supply circuit C and is independent of the lubrication circuit of the turbine engine 1. The fluid may therefore be different from the oil used in the lubrication circuit of the turbine engine 1. The fluid may therefore have a lower freezing point or viscosity characteristics that are better suited to the conditions of the turbine engine 1, particularly when the operating temperatures of the turbine engine 1 are low. For example, the fluid in the hydraulic supply circuit C has a freezing point of between −70° C. and −50° C., in particular between −65° C. and −60° C. The fluid pressure in the hydraulic supply circuit C is advantageously greater than 100 bar, preferably greater than 200 bar and even more preferably between 250 bar and 350 bar. As the hydraulic supply circuit C is closed, it is not aerated and it is therefore possible to implement high pressures in the hydraulic circuit. This allows to reduce the overall dimensions of the hydraulic actuator 46.

With reference to FIG. 6, the hydraulic circuit C advantageously comprises, for example, a hydraulic accumulator 61 to compensate for variations in the volume of the fluid due to its compressibility and expansion. The hydraulic accumulator 61 is in fluid communication with the pump 54. The hydraulic accumulator 61 may be integrated with the pump 54. The hydraulic accumulator 61 is secured in rotation to the hydraulic actuator 46 and may therefore be movable in rotation about the longitudinal axis X.

As the axial pistons 54c and the hydraulic accumulator 61 may rotate relative to the longitudinal axis X, the invention allows to dispense with a rotating hydraulic transfer device. Thanks to the invention, the tilting of the main plate 54e drives the axial pistons 54c in translation. This allows to vary the stroke of the axial pistons 54c and therefore the flow rate of the pump 54. The volume in the first and second chambers 46a, 46b of the hydraulic actuator 46 varies, which causes the rod 49 or the case 48 of the hydraulic actuator 46 to move in translation, resulting in the vanes 30 being driven in rotation about their pitch axes C.

Thanks to the invention, there is no need for additional members such as a rotating electric transformer associated with an electric motor allowing to vary the flow rate of the pump 54, or a rotating oil transfer allowing to transfer oil between the pump 54 and the hydraulic actuator 46, which also reduces oil leaks and the need for additional recovery pumps. In addition, the power consumption is low because there is no electric motor in operation when the aircraft is in flight, the pump 54 being driven by the drive shaft 32.

Also, as the pump 54 is advantageously reversible, there is no need for a flow rate reversal valve or a controlled circuit during the flight phases of the aircraft.

The invention claimed is:

1. A module for an aircraft turbine engine, the module having a longitudinal axis and comprising:
    a hub centered on the longitudinal axis and configured to be movable in rotation about the longitudinal axis;
    vanes carried by the hub, each of the vanes being movable about a pitch axis extending radially with respect to the longitudinal axis; and
    a device for changing the pitch of the vanes about their pitch axes, the device comprising:
        a hydraulic actuator configured to be movable in rotation about the longitudinal axis and configured to drive the vanes about their pitch axes; and
        a supply pump for supplying fluid to the hydraulic actuator, the supply pump comprising:
            axial pistons configured to be movable in rotation about the longitudinal axis and configured to transfer the fluid to the hydraulic actuator;
            a connecting plate connected to the axial pistons and cooperating with an annular main plate centered on the longitudinal axis, the main plate being configured to be stationary in rotation about the longitudinal axis and tiltable relative to the longitudinal axis, the connecting plate being arranged between the main plate and the axial pistons;
            wherein the axial pistons are able to move in translation in a direction parallel to the longitudinal axis, and wherein the tilting of the main plate causes the axial pistons to move in the direction parallel to the longitudinal axis; and
        an auxiliary actuator connected to the connecting plate and configured to drive in rotation the connecting plate about the longitudinal axis.

2. The module according to claim 1, wherein the pump comprises a shroud mounted around the main plate and the connecting plate and configured to be stationary in rotation about the longitudinal axis.

3. The module according to claim 1, wherein the main plate is tiltable through an angle of tilting between −45° and 45°, and wherein an angle of tilting of 0° corresponds to a position of the main plate wherein the main plate is perpendicular to the longitudinal axis.

4. The module according to claim 1, wherein the device further comprises an actuator connected to the main plate and configured to tilt the main plate relative to the longitudinal axis.

5. The module according to claim 1, wherein the connecting plate is configured to be able to move in rotation about the longitudinal axis and is in flat abutment on the main plate.

6. The module according to claim 1, wherein the axial pistons are connected to the connecting plate by a ball-and-socket joint.

7. The module according to claim 1, wherein the pump comprises a transmission axle centered on the longitudinal axis, secured in rotation to the connecting plate, and around which the main plate is mounted.

8. The module according to claim 7, further comprising a drive shaft secured in rotation to the hub and configured to drive the transmission axle in rotation about the longitudinal axis.

9. The module according to claim 1, further comprising an electronic control circuit configured to transmit a command to the auxiliary actuator to drive in rotation the connecting plate about the longitudinal axis.

10. The module according to claim 1, wherein the auxiliary actuator is connected to the connecting plate by a splined connection, a universal joint connection, an Oldham joint connection, or an embedded connection.

11. The module according to claim 8, wherein the hydraulic actuator is a cylinder secured in rotation with the drive shaft, wherein the hydraulic actuator comprises:
    a case and a rod arranged within the case; and
    first and second chambers connected to the pump defined in the case,
    wherein the rod or the case are movable in translation and connected to the vanes.

12. The module according to claim 11, wherein the rod or the case is secured in rotation to the drive shaft.

13. A turbine engine for an aircraft comprising a module according to claim 1.

* * * * *